United States Patent [19]
Bellante et al.

[11] Patent Number: 4,753,347
[45] Date of Patent: Jun. 28, 1988

[54] STORAGE CONTAINER FOR VIDEO CASSETTES

[75] Inventors: Louis Bellante, Solon; Thomas W. Horn, North Royalton, both of Ohio

[73] Assignee: ZBS Industries, Inc., Cleveland, Ohio

[21] Appl. No.: 861,324

[22] Filed: May 9, 1986

[51] Int. Cl.[4] .......................................... B65D 85/672
[52] U.S. Cl. .................................... 206/387; 206/472; 206/493
[58] Field of Search ........................ 206/387, 472, 493; 242/68.1–68.5

[56] References Cited

U.S. PATENT DOCUMENTS

| | | | |
|---|---|---|---|
| 3,990,574 | 11/1976 | Roccaforte | 206/493 |
| 4,153,178 | 5/1979 | Weavers | 206/387 |
| 4,184,594 | 1/1980 | Hehn | 206/387 |
| 4,291,801 | 9/1981 | Basili et al. | 206/387 |
| 4,347,933 | 9/1982 | Ishida et al. | 206/493 |
| 4,428,481 | 1/1984 | Basili | 206/387 |
| 4,428,482 | 1/1984 | Ogawa | 206/493 |
| 4,496,048 | 1/1985 | Sykes | 206/387 |
| 4,593,814 | 6/1986 | Hagiwara et al. | 206/493 |
| 4,614,269 | 9/1986 | Dietze et al. | 206/493 |

FOREIGN PATENT DOCUMENTS

| | | | |
|---|---|---|---|
| 0134733 | 3/1985 | European Pat. Off. | 206/387 |
| 2508221 | 12/1982 | France | 206/387 |

Primary Examiner—Jimmy G. Foster
Attorney, Agent, or Firm—Calfee, Halter & Griswold

[57] ABSTRACT

This invention relates to a video cassette storage container capable of securely accomodating both VHS and Beta video cassettes. The container comprises an enclosure having top, bottom, and side wall panels. The bottom panel includes a pair of upstanding, Y-shape posts, each adapted to engage the internal spline teeth in the reel hubs of a video cassette. The Y-shape posts are positioned upon the bottom panel such that when a video cassette is inserted into the enclosure, the posts guide the cassette into position within the enclosure and create an interference fit with the internal spline teeth of the reel hubs. The posts fixedly secure the cassette within the enclosure and inhibit the inadvertent rotation of the reels. Preferably, in addition to the Y-shape posts, the enclosure includes means to securely lock the enclosure in the closed position.

15 Claims, 3 Drawing Sheets

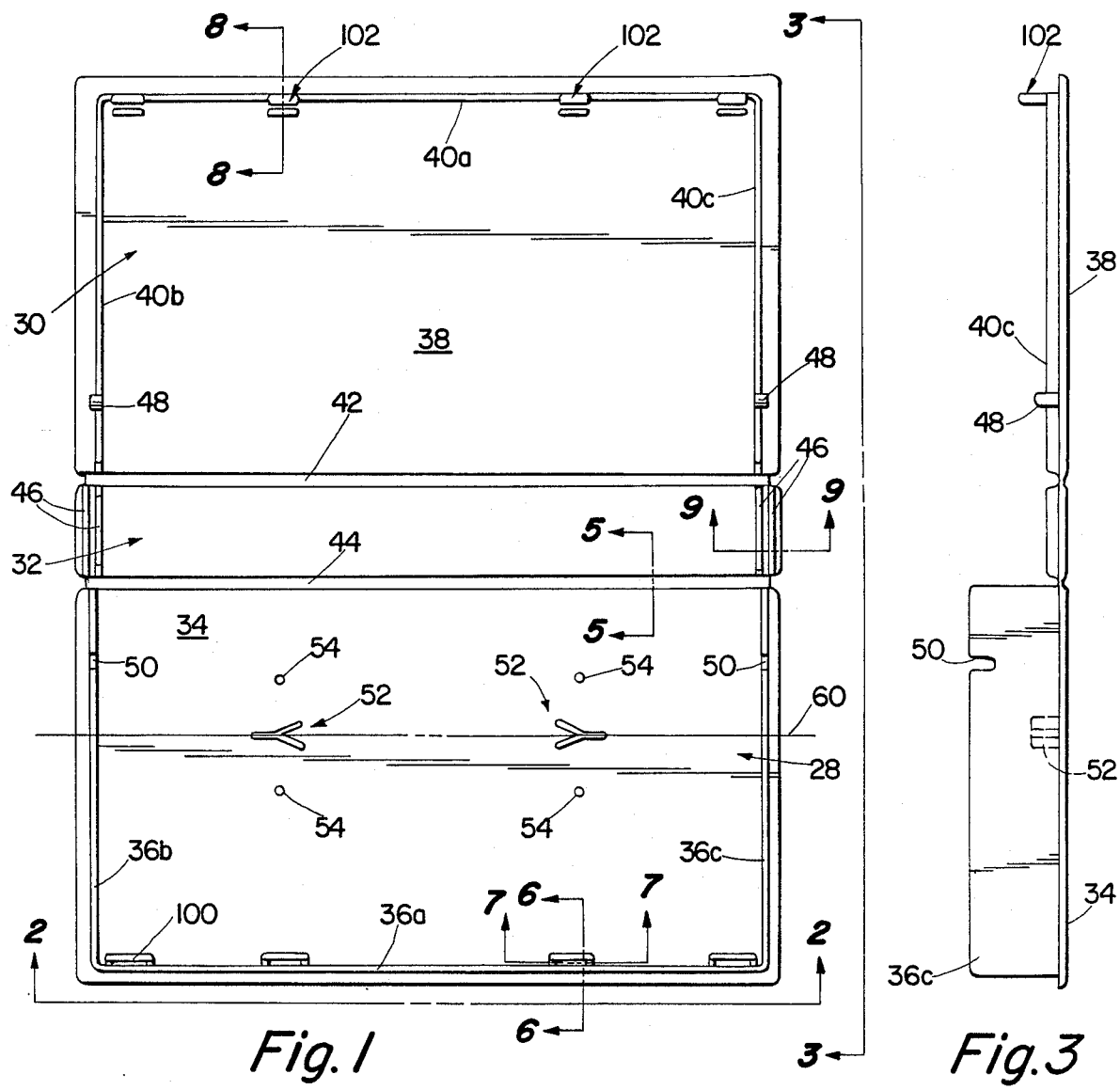
Fig. 1
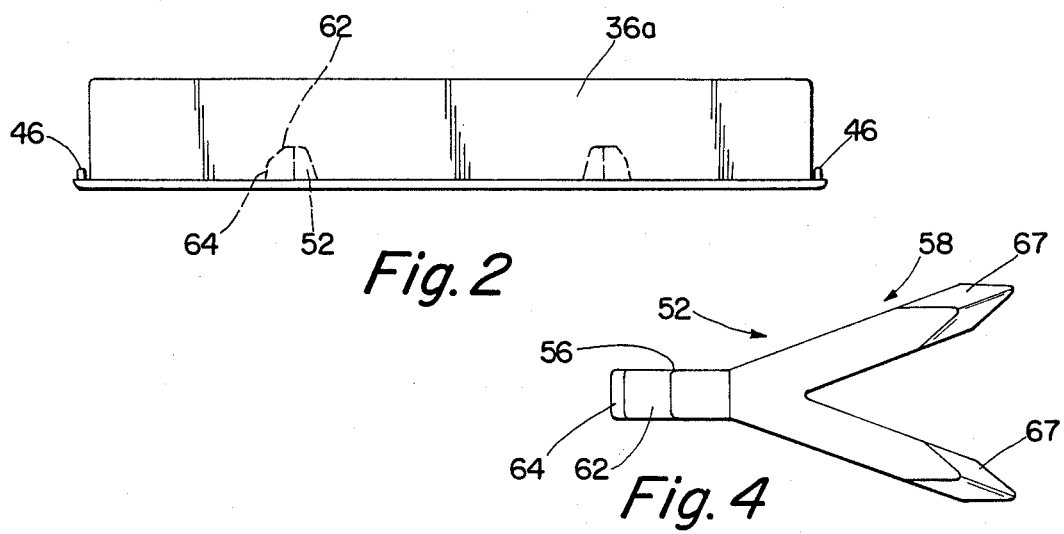
Fig. 2
Fig. 3
Fig. 4

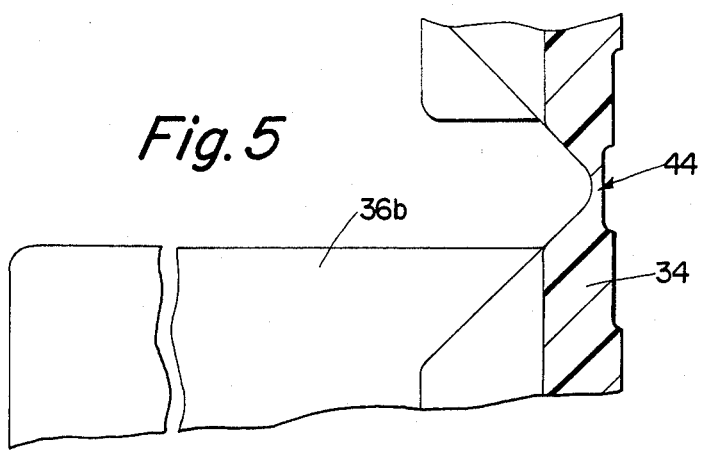
Fig. 5
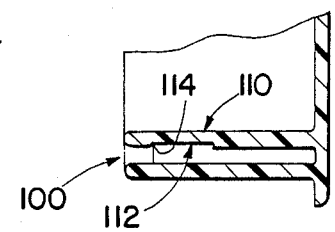
Fig. 6
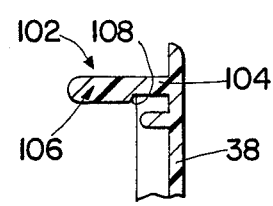
Fig. 7
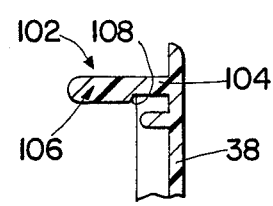
Fig. 8
Fig. 9
Fig. 10

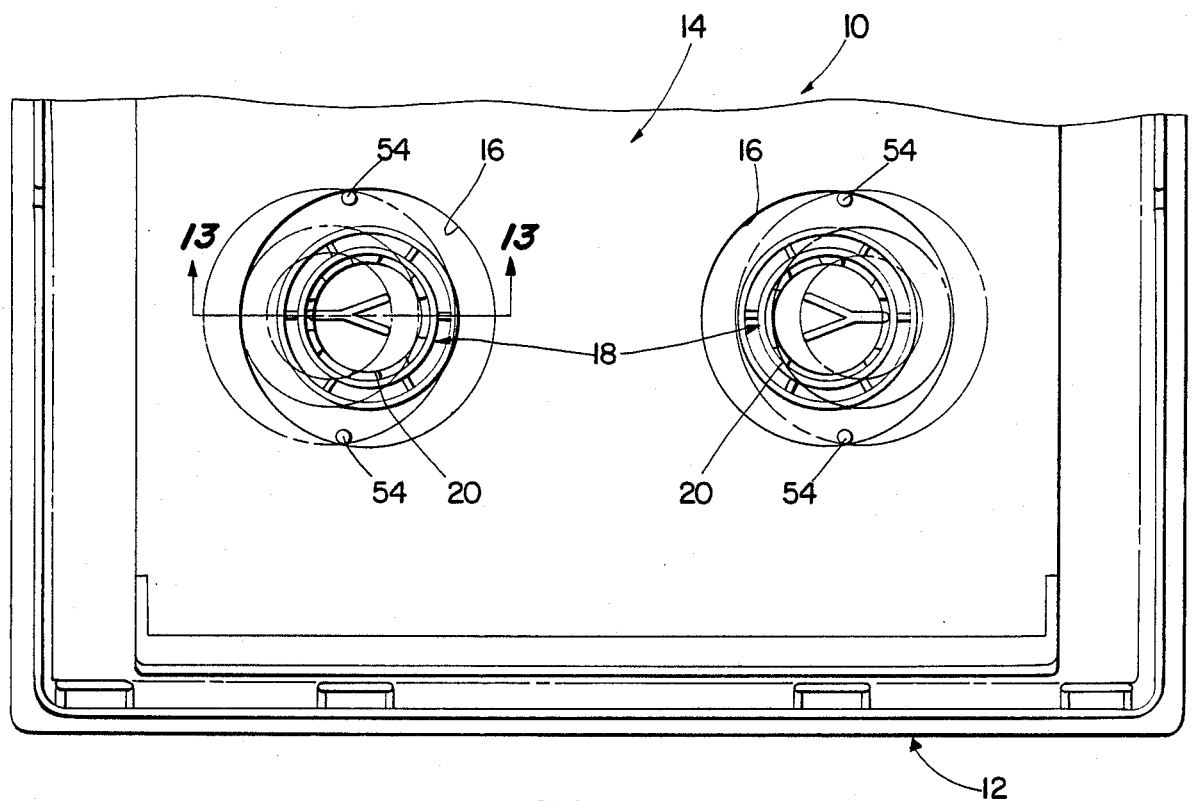
Fig. 11
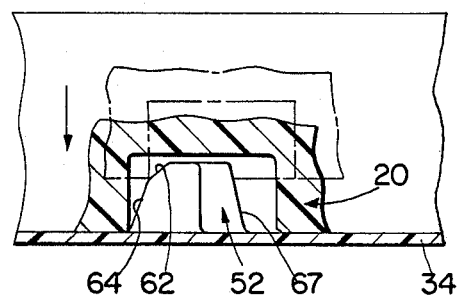
Fig. 12
Fig. 13
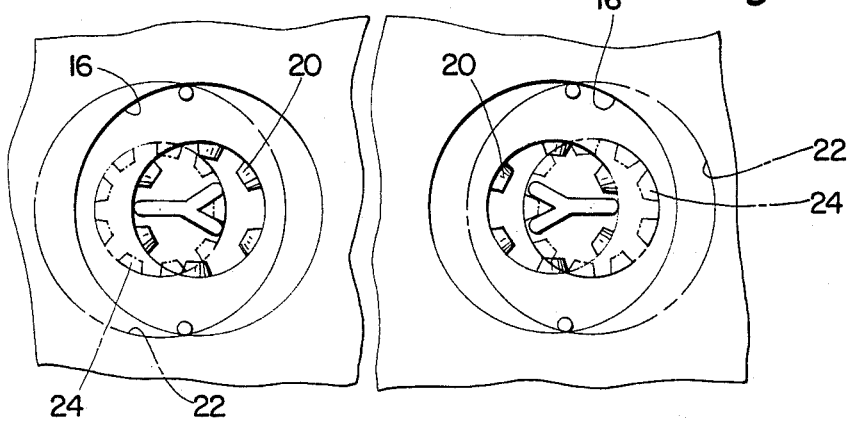

STORAGE CONTAINER FOR VIDEO CASSETTES

DISCLOSURE

This invention relates to a container for video cassettes. More particularly, this invention relates to a universal storage container capable of securely accomodating both VHS and Beta type video cassettes.

BACKGROUND OF THE INVENTION

Video cassettes and video cassette recorders are continuing to gain popularity and are fast becoming a commonplace household item. Today, as a result of such popularity a strong market demand has been created and video cassettes may now be purchased and/or leased by consumers at a variety of stores and outlets, sales of cassettes no longer being limited to the traditional "video" store. In many sales and rental locations the video cassettes are handled and displayed along with a multitude of other items, and at time the cassettes are subjected to severe handling by both store personnel and prospective buyers. to protect the video cassettes from rough handling, a variety of storage containers have been developed. This invention pertains to a new and useful storage container for a video cassette.

Video cassettes are produced by various manufacturers and are generally available in two different sizes, VHS size and the smaller, more compact Beta size. Some prior storage containers are manufactured in two distinct sizes to separately accomodate either VHS or Beta cassettes. Recently, however, universal storage containers have been made available. Such universal containers are capable of accomodating both VHS and Beta cassettes. Some examples of universal storage containers are disclosed in the following U. S. Patents: Basili U.S. Pat. No. 4,428,481; Hehn U.S. Pat. No. 4,184,594; and Basili, et al, U.S. Pat. No. 4,291, 801.

Some of the considerations applicant feels are important in the design of a universal container include the need to quickly and easily guide and align cassettes (both VHS and Beta) into position within the container. Also, applicant feels it is important to minimize movement of the cassette within the enclosure, and also to minimize movement of the reels relative to the cassette itself. The reels are normally supported on reel hubs that have some degree of play (movement) relative to the cassette. In use, the container may be subjected to rough handling, and the ability to minimize movement of the cassette and the reels helps to minimize damage to those elements during handling. Thus, the need to retain the cassette in the container, and also to retain the reel hubs against movement is significant. Furthermore, applicant feels it is important to provide sufficient means to ensure that the container will remain closed and the cassette held firmly therein during handling.

SUMMARY OF THE INVENTION

The present invention provides an improved universal storage container capable of accomodating both VHS and Beta video cassettes. A storage container produced in accordance with the teachings of this invention provides an enclosure wherein a video cassette may be easily inserted and engaged therein in a manner that restrains movement of the cassette in the container and which also positively restrains the reels against movement relative to the cassette.

Additionally, the invention provides a locking mechanism for securely locking the container in the closed position so as to help prevent the container from opening under such adverse conditions such as abusive handling. The locking mechanism includes a locking member and a receptacle with a resiliently deflectable wall for securely engaging the locking member.

In a preferred embodiment, a storage container according to the present invention comprises an enclosure having top, bottom, and side panels. The bottom panel includes a pair of integral (preferably Y-shaped) posts for engaging the internal spline teeth on the reel hubs of a video cassette. The posts are configured such that when a video cassette is inserted into the enclosure the posts engage the spline teeth on the reel hubs and guide the cassette into position within the enclosure while also creating an interference fit between the posts and the spline teeth of the cassette reels. The profile of the posts; and the interference fit between the posts and the spline teeth of the reels results in the cassette being securely retained in the enclosure and the reels being securely retained against movement relative to the cassette.

The posts are preferably Y-shaped and are configured to engage against intermediate portions of the spline teeth in an interference fit. The Y-shaped profile of the posts, and the interference fit between the Y-shaped posts and intermediate portions of the spline teeth provide locking of the cassette in the enclosure and also locking of the reels against movement relative to the cassette.

In an additional feature of the invention, the storage container includes integral means for engaging the reel openings of a Beta or a VHS cassette for further retaining the cassette in the container. Preferably, two pairs of locking pins are provided in the container, each pair of locking pins associated with a respective Y-shaped post. The pairs of locking pins cooperate to resist movement of a cassette in directions transverse to the Y-shaped posts.

Besides the Y-shape posts and the pairs of locking pins, a container made in accordance with the present invention includes means for locking the container in the closed position when the video cassette is inserted and the container is shut. The locking means comprise a plurality of locking members integrally connected with the top wall of the container, and respective locking receptacle integrally connected with a side wall of the container and adapted to receive the locking member. Preferably, each locking receptacle includes a wall that is contiguous with a part of the side wall of the container.

To ensure a secure engagement, each locking member has a protruding boss with a locking surface, and the wall of the associated locking receptacle is resiliently deflectable and includes another locking surface. When the container is being closed each locking member is forced into its respective receptacle, and the boss on the locking member exerts a wedging force on the receptacle causing the wall of the receptacle to defect and then to snap back behind the boss, so that the locking surfaces on the boss and the wall of the receptacle cooperate to secure the locking member within the receptacle.

The container preferably comprises a molded plastic article with the locking posts, the locking member(s) and the receptacle(s) all formed as integral parts thereof.

The invention, is more fully described in the following description and the annexed drawings.

BRIEF DESCRIPTION OF THE DRAWINGS

FIG. 1 is a top plan view of a container according to the invention, in an open, unfolded condition;

FIG. 2 is a side view of the container of FIG. 1 taken from the direction 2—2 thereof;

FIG. 3 is a side view of the container of FIG. 1, taken from the direction 3—3;

FIG. 4 is an enlarged top view of one of the Y-shaped posts of the container of FIG. 1;

FIG. 5 is a sectional view of the container of FIG. 1 taken along the line 5—5;

FIG. 6 is a sectional view of the container of FIG. 1 taken along the line 6—6;

FIG. 7 is a sectional view of a portion of the container of FIG. 1 taken from the direction 7—7;

FIG. 8 is a sectional view of a portion of the container of FIG. 1, taken on line 8—8.

FIG. 9 is a sectional view of a portion of the container shown in FIG. 1 taken on line 9—9 thereof; and FIG. 10 is a plan view of the container of FIG. 1, taken from the bottom thereof;

FIG. 11 is a schematic illustration of the manner in which Beta and VHS Cassettes are supported in a container according to the invention;

FIG. 12 is another fragmentary illustration of the manner in which the reels are supported by the posts; and FIG. 13 is a sectional view of FIG. 11, taken along the line 13—13 and schematically illustrate the manner in which a reel engages a post.

DETAILED DESCRIPTION OF THE PREFERRED EMBODIMENT

Referring first to FIGS. 11-13, there is illustrated in solid lines a fragmentary portion of a Beta cassette 10 supported in a container 12 contructed according to the invention. The Beta cassette 10 comprises a housing 14 with a pair of reel openings 16. The Beta cassette 10 has a pair of reels (not shown) with reel hubs 18 extending through the reel openings 16. Each of the reel hubs 18 includes a plurality of internal spline teeth 20 mounted therein. Although not illustrated, a VHS video cassette is generally similar to a Beta cassette with the exception that the VHS cassette is approximately 20% larger and thus the spacing between the reel hubs is also about 20% greater than that of the Beta cassette. Also, the relative size and spacing of the internal spline teeth of a VHS cassette may be different that for a Beta cassette. FIGS. 11-13 illustrate, in phantom, the relative profiles of the reel openings 22 and internal splines 24 for a VHS cassette.

With either a Beta or a VHS cassette, the reel hubs have some "play", i.e., relative range of movement, relative to the reel openings. More specifically, the reel hubs are spring biased to centered positions in their reel openings, and in a manner that allows some limited lateral and axial movement relative to their respective reel openings.

FIGS. 1-10 illustrate a container 26 according to the invention. The container 26 is preferably a molded plastic article comprising a bottom portion 28 for receiving a cassette, a top portion 30, and a spine portion (backbone) 32 hingedly connected with the top and the bottom portions. The hinged connections enable the top portion 30 to be pivoted into mating engagement with the bottom portion 28 to define an enclosure for a video cassette.

The bottom portion 32 includes a planar bottom panel 34 and a series of side wall panels 36a, 36b, 36c which extend (i) normal to the bottom panel 34 and (ii) around the outside perimeter of the bottom panel 34. The top portion 30 includes a planar top panel 38 and a series of side wall portions 40a, 40b, 40c which extend (i) normal to the top panel 38 and (ii) around the outside perimeter of the top panel 38. A pair of living hinges 42, 44 between the top and bottom portions 30, 28 and the spine 32 allow the top portion 30 to fold onto the bottom portion 28 to complete an enclosure for a video cassette.

To help assure proper alignment of the top portion 28, and the bottom portion 30 when the container 26 is being closed, the container includes various alignment devices. There are pairs of parallel flanges 46 located at each end of the spline portions 32 which form a pair of straight channels that engage opposite sides of the side wall portions 36b, 36c, when the container is being closed. Also, a pair of upstanding tabs 48 are provided on the side wall portions 40b, 40c of the top portion 30. The tabs 48 engage respective recesses 50 located in the side wall portions 36b, 36c when the container is being closed.

The bottom panel 34 includes a pair of integral upstanding, generally Y-shaped posts 52, and a pair of integral locking pins 54 associated with each post 52. The Y-shaped posts 52 are configured to be received in the reel hubs (e.g., 18) of either Beta or VHS video cassettes and to engage the spline teeth of the reel hubs in an interference fit. The locking pins 54 are configured to engage the reel openings. (e.g., 16) in either Beta or VHS cassettes.

Each of the Y-shaped posts 52 comprises a straight stem 56 and a V-shaped portion 58 comprising diverging walls 58a, 58b. The Y-shaped posts 52 are located on the bottom panel 34 with the straight stems 56 disposed along a common longitudinal reference axis 60, and the V-shaped portions 58 facing each other in a symetrically opposed position.

The vertical profile of the Y-shaped posts 52 are illustrated in FIGS. 2-4 and 13. Specifically, the stem 56 includes a leading edge 62 and a locking edge 64. The leading edge extends at an angle of about 53° relative to the plane of the bottom panel 34. The locking edge 64 extends at an angle of about 69° relative to the plane of the bottom panel 34. The V-shaped walls 58a, 58b of each post have edges 67 each extending at an angle of about 76° to the plane of the bottom panel 34.

When the reel hubs of a Beta or VHS cassette are inserted over the pair of Y-shaped posts 52, the posts will engage the internal splines of the cassette, and will guide the reel hubs of the cassette downward over the Y-shaped posts. As the reel hubs move downward, the posts will engage intermediate portions of the spline teeth. More specifically, the stems 56 of the posts will engage the splines of smaller Beta cassettes and urge the reel hubs away from each other while engaging the intermediate portions of the splines in an interference fit. The V-shaped walls 58 will engage the splines of larger VHS cassettes and urge the reel hubs toward each other while engaging the splines in an interference fit. The ability of the reel hubs to move laterally relative to their reel openings enables the reel hubs to be moved toward or away from each other in the foregoing manner. The top edges of the Y-shaped posts are all rounded to assist in guiding the reel hubs of a cassette into position within the container.

Significantly, with the smaller Beta cassettes, the relatively wide angled guide surfaces 62 and the steeper locking surface 64 cooperate to guide the reel hubs and to lock the reel hubs in the foregoing manner. The guide surfaces 62 are angled to engage the splines of the reel hubs and to guide the reel hubs onto the posts 52. The steeper locking surfaces 64 then engage the splines of the reel hubs in an interference fit. With larger VHS cassettes, the surfaces 67 on the V-shaped walls 58a, 58b act as both guide and locking surfaces.

The angular relation of the walls 58 to the stems 56 is selected to enable the walls 58 or the stems 56 to engage respective "intermediate" portions of the spline teeth of VHS or Beta cassettes in an interference fit. In this application, reference to the walls 58 or the stems 56 engaging "intermediate" portions of spline teeth means engaging the spline teeth along their side walls (flanks), i.e., 20a in FIG. 12, or along their base circle, i.e., 20b in FIG. 12.

In assembling a cassette with the container of the invention, the side of the cassette containing the reel hubs is inserted over the Y-shaped posts 52. With a smaller sized Beta cassette, the guide edge 62 of the Y-shaped posts will act as a cam to urge the reel hubs away from each other and the steeper locking edges 64 will engage the internal splines in an interference fit, particularly at or adjacent the junction of the Y-shaped post with the bottom panel 34. Thus, the straight stems 56 of the Y-shaped portions will engage the intermediate portions of the internal splines in the interference fit, as shown schematically in full lines in FIG. 12.

With a larger VHS cassette, the edges 67 along the V-shaped walls 58 act as both cam guides and locking surfaces to guide the spline teeth over the posts and also to engage intermediate portions of the spline teeth in an interference fit, as shown schematically in phantom in FIG. 12.

As the reel hub of either a Beta or a VHS cassette is fully inserted over a Y-shaped post, the pair of locking pins 54 associated with that post will engage against the inner surface of the reel opening (e.g., 16) in the cassette. As seen from FIGS. 11 and 12, the pairs of locking pins 54 are located at the intersections of eccentric circles for the reel openings of Beta and VHS cassettes, so that the locking pins will engage against the reel openings in either type cassette. The locking pins 54 extend away from bottom panel 34 by only a small amount, in comparison to the amount the posts 52 extend away from the bottom panel.

The foregoing locking structure provides secure locking action of the reel relative to the cassette and also of the cassette relative to the container. More specifically, the interference fit between the the Y-shaped posts and the intermediate portions of the splines lock the reels of either type cassette against rotation relative to the cassette. Also, the interference fit, and the urging of the reel hubs either toward each other (VHS) or away from each other (Beta) exert forces through the reel hubs and against the cassette that help resist transverse movement of either the cassette or the reel hub relative to the Y-shaped posts (i.e., in X and Y directions relative to axis 60). In addition, the pairs of locking pins 54 cooperate to provide additional retention of the cassette, in directions transverse to the Y-shaped posts (i.e., in the X and Y-directions relative to axis 60).

In addition to the Y-shape posts, the invention provides a means for securely locking the container closed when the top portion 30 is folded upon the bottom portion 28 to complete an enclosure for a cassette. Such locking means comprise a plurality of upstanding locking receptacles 100 integral with the bottom portion 28, and respective locking members 102 integral with the top portion 30. The locking receptacles 100 are designed to receive and engage respective locking members 102 on the top portion 30 when the container is shut.

Each locking members 102 comprises a narrow stem 104 contiguous with top panel 38, and an enlarged boss 106 with a locking surface 108. Each locking receptacle 100 comprises a locking wall 110 extending away from the bottom panel 34 and in spaced relation to part of side wall portion 36c. Each locking wall 110 has a narrow recessed portion 112 and an enlarged distal portion 113 with a locking surface 114. The narrow recessed portion 112 makes the wall 110 resiliently deflectable when a locking member 102 is inserted into the receptacle.

When the container is closed the locking members 102 are inserted into the receptacles 100. The enlarged bosses 106 on the locking members exert wedging forces which cause the walls 113 of the locking receptacles to deflect resiliently until the bosses 106 clear the locking surfaces 114. The walls 110 then snap into positions with the locking surfaces 114 abutting the locking surfaces 108 to secure the top and bottom portions together.

Although the invention has been shown and described with respect to certain preferred embodiments, it is obvious that equivalent alterations and modifications will occur to those of ordinary skill in the art. The present invention includes all such alterations and modifications, and is limited only by the scope of the following claims.

What is claimed:

1. A storage container for retaining a video cassette of a type including a casing with a pair of reel openings and a pair of reel hubs, each reel hub extending through a respective reel opening, and each reel hub having internal spline teeth, said container comprising:

an enclosure having top, bottom, and side wall panels, said bottom wall panel including a pair of integral posts for engaging the internal spline teeth of a pair of reel hubs, said posts being dimensioned for engaging the spline teeth of a pair of reel hubs of a video cassette for guiding the video cassette into a predetermined position within said enclosure and for creating an interference fit between said posts and the spline teeth of the reel hubs to restrain the video cassette and the reel hubs against movement transverse to said posts and to restrain the reels against movement relative to the video cassette;

wherein each of said posts is Y-shaped with (i) a V-shaped portion having an apex and an open end and (ii) a stem extending away from the apex of the V-shaped portion, said pair of posts being positioned on said bottom panel such that the open ends of the V-shaped portions of the posts are facing each other and the stems of the Y-shaped posts lie along a common reference axis.

2. A storage container as set forth in claim 1 wherein said posts are dimensioned for engaging the internal spline teeth on the reel hubs of either a VHS or a Beta video cassette.

3. A storage container as set forth in claim 2 wherein said posts are dimensioned to engage intermediate portions of the spline teeth of a video cassette.

4. A storage container as set forth in claim 1 further including means integral with said bottom panel for engaging against the reel openings of a Beta or VHS cassette for further retaining a Beta or a VHS video cassette in said container.

5. A storage container as set forth in claim 1 wherein the stem of each of said Y-shape posts includes a leading edge to assist in guiding the internal splines of a reel hub thereover and a locking edge dimensioned to engage the intermediate portions of the splines of a reel hub in an interference fit.

6. A storage container as set forth in claim 5 wherein said leading edge of said stem of each Y-shape post extends at an angle of approximately 53° to said bottom panel.

7. A storage container as set forth in claim 6 wherein said locking edge of said stem of each said Y-shape post extends at an angle of approximately 69° to said bottom panel.

8. A storage container as set forth in claim 7 wherein the V-shape portions of each post diverges from the stem of the post an angle of about 20°.

9. A storage container as set forth in claim 5 further including means integral with said bottom panel for engaging the reel openings of a video cassette for further retaining the cassette in the container, comprising two pairs of pins, each pair of pins associated with a respective Y-shaped post and disposed on opposite sides of the reference axis, each pair of pins disposed to engage against a respective reel opening of a cassette and both pairs of pins cooperating to resist movement of the cassette in directions transverse to the Y-shaped posts.

10. A storage container as defined in claim 1, further including releasable closure means for locking said top wall to one of said side walls, said closure means comprising a locking member integral with said top panel and a locking receptacle comprising a portion of said side wall and a locking wall member integral with said portion of said side wall and spaced therefrom, said locking member having a locking surface, said locking wall member of said receptacle having a portion which deflects resiliently upon insertion of said locking member into said receptacle, said locking wall member of said receptacle having a locking surface for engaging the locking surface on said locking member to resist disengagement of said locking member from said receptacle.

11. A storage container for retaining a video cassette of a type including a casing with a pair of reel openings and a pair of reel hubs, each reel hub extending through a respective reel opening, and each reel hub having internal spline teeth, said container comprising:
 an enclosure having top, bottom, and side wall panels, said bottom wall panel including a pair of integral posts for engaging the internal spline teeth of a pair of reel hubs, said posts being dimensioned for engaging the spline teeth of a pair of reel hubs of a video cassette for guiding the video cassette into a predetermined position within said enclosure and for creating an interference fit between said posts and the spline teeth of the reel hubs to restrain the video cassette and the reel hubs against movement transverse to said posts and to restrain the reels against movement relative to the video cassette;
 wherein said posts are dimensioned for engaging intermediate portions of the internal spline teeth on the reel hubs of either a VHS or a Beta video cassette;
 wherein each of said posts is Y-shaped with (i) a V-shaped portion having an apex and an open end and (ii) a stem extending away from the apex of the V-shaped portion, said pair of posts being positioned on said bottom panel such that the open ends of the V-shaped portions of the posts are facing each other and the stems of the Y-shaped posts lie among a common reference axis; and
 wherein the stem of each of said Y-shaped posts includes a leading edge to assist in guiding the internal splines of a reel hub thereover and a locking edge dimensioned to engage the intermediate portions of the splines of a reel hub in an interference fit.

12. A storage container as set forth in claim 11 wherein said leading edge of said stem of each Y-shape post extends at an angle of approximately 53° to said bottom panel.

13. A storage container as set forth in claim 12 wherein said locking edge of said stem of each said Y-shape post extends at an angle of approximately 69° to said bottom panel.

14. A storage container as set forth in claim 13 wherein the V-shape portions of each post diverges from the stem of the post at an angle of about 20°.

15. A storage container as set forth in any of claims 1 or 2 wherein said storage container is an integrally molded plastic member.

* * * * *